United States Patent
Goto et al.

(10) Patent No.: US 7,794,772 B2
(45) Date of Patent: Sep. 14, 2010

(54) CONCENTRATED COFFEE EXTRACT AND PROCESS FOR PRODUCING THE SAME

(75) Inventors: Yukio Goto, Tokyo (JP); Katsuya Uno, Tokyo (JP); Shigeru Tanaka, Kanagawa (JP)

(73) Assignee: Takasago International Corporation, Tokyo (JP)

( * ) Notice: Subject to any disclaimer, the term of this patent is extended or adjusted under 35 U.S.C. 154(b) by 531 days.

(21) Appl. No.: 11/661,756

(22) PCT Filed: Sep. 2, 2005

(86) PCT No.: PCT/JP2005/016561
§ 371 (c)(1),
(2), (4) Date: Mar. 2, 2007

(87) PCT Pub. No.: WO2006/028193
PCT Pub. Date: Mar. 16, 2006

(65) Prior Publication Data
US 2007/0231443 A1  Oct. 4, 2007

(30) Foreign Application Priority Data
Sep. 8, 2004  (JP) ............................. 2004-260759

(51) Int. Cl.
A23F 3/00 (2006.01)
(52) U.S. Cl. ...................... 426/594; 426/387; 426/386; 426/495; 426/432
(58) Field of Classification Search ...................... None
See application file for complete search history.

(56) References Cited
U.S. PATENT DOCUMENTS

| | | | |
|---|---|---|---|
| 4,277,509 A * | 7/1981 | Wouda | 426/387 |
| 4,794,010 A | 12/1988 | Jones et al. | 426/387 |
| 5,225,223 A | 7/1993 | Vitzthum et al. | |
| 5,236,729 A | 8/1993 | Schlecht et al. | 426/417 |
| 5,323,623 A | 6/1994 | Carns et al. | |
| 5,997,929 A * | 12/1999 | Heeb et al. | 426/433 |

(Continued)

FOREIGN PATENT DOCUMENTS

CN 1063797 A 8/1992

(Continued)

OTHER PUBLICATIONS

Sivetz, Michael and Norman W. Desrosier, Coffee Technology, 1979, AVI Publishing Company, Inc. pp. 376, 379-380.*

(Continued)

*Primary Examiner*—Jennifer C McNeil
*Assistant Examiner*—Hong Mehta
(74) *Attorney, Agent, or Firm*—Morgan, Lewis & Bockius LLP

(57) ABSTRACT

The present invention has an object of providing a concentrated coffee extract which is rich in aroma component released when the roasted coffee beans are ground and has an amount of coffee oil controllable in accordance with the use and purpose, and a process for industrially producing the same. According to the present invention, the above object is achieved by separating an aroma component-containing distillate, a coffee oil-containing liquid, and a coffee extract from a slurry obtained by wet-grinding roasted coffee beans, and after the coffee extract is concentrated, adding back the aroma component-containing distillate and the coffee oil-containing liquid.

20 Claims, 2 Drawing Sheets

U.S. PATENT DOCUMENTS

| | | | | |
|---|---|---|---|---|
| 6,165,536 | A | * 12/2000 | Heeb et al. | 426/594 |
| 6,455,093 | B1 | * 9/2002 | Furrer et al. | 426/594 |
| 2003/0012858 | A1 | 1/2003 | Furrer et al. | |

FOREIGN PATENT DOCUMENTS

| | | |
|---|---|---|
| CN | 1034657 C | 4/1997 |
| CN | 1377232 A | 10/2002 |
| CN | 1382019 A | 11/2002 |
| CN | 1296385 C | 1/2007 |
| JP | 58175441 | 10/1983 |
| JP | 1175694 | 7/1989 |
| JP | 04-210555 | 7/1992 |
| JP | 4-287638 | 10/1992 |
| JP | 2000-333612 | 12/2000 |
| JP | 2002-511236 | 4/2002 |
| JP | 2003-033137 | 2/2003 |
| JP | 2003-507047 | 2/2003 |
| WO | WO99/52378 | 10/1999 |
| WO | WO 99/052378 | 10/1999 |
| WO | WO 99/52378 | 10/1999 |
| WO | WO00/69274 | 11/2000 |
| WO | WO01/13735 | 3/2001 |

OTHER PUBLICATIONS

Leung, Wallace Woon-Fong. Industrial Centrifugation Technology, 1998, McGraw-Hill Professional, 1st Edition, pp. 123-127.*

First Office Action before the State Intellectual Property Office, China, Mar. 25, 2010.

* cited by examiner

US 7,794,772 B2

CONCENTRATED COFFEE EXTRACT AND PROCESS FOR PRODUCING THE SAME

CROSS-REFERENCE TO RELATED APPLICATIONS

The present application is a U.S. National Phase Application of International Application PCT/JP2005/016561, filed Sep. 2, 2005, which claims the benefit of Japanese Patent Application No. 2004-260759, filed Sep. 8, 2004, each of which is incorporated by reference in its entirety.

TECHNICAL FIELD

The present invention relates to a concentrated coffee extract and a process for producing the same. The present invention specifically relates to a concentrated coffee extract of a type rich in aroma and suitable to various products including drinks, cold sweets and desserts, and a process for industrially producing such a concentrated coffee extract.

BACKGROUND ART

Production of a concentrated coffee extract includes steps of roasting, grinding, extraction and concentration. Various processes are proposed in order to minimize the loss and change of the aroma component in each step. An excessive oil content undesirably promotes the deterioration of the concentrated coffee extract and causes separation and precipitation of coagulates during a long storage period. Therefore, processes for suppressing the elution of such an excessive oil content are being studied.

For example, for recovering the aroma component released at the time of grinding (hereinafter, occasionally referred to as the "grinding aroma" or "aroma component"), a process of cooling and condensing the aroma component using liquid nitrogen to recover the aroma component is proposed (see, for example, U.S. Pat. No. 5,323,623). However, in consideration of the industrial-scale production, it is not preferable to use low temperature solvents such as liquid nitrogen, liquid ammonia or the like from the viewpoint of the cost.

A process of capturing the grinding aroma in a solvent by grinding the roasted coffee beans in a wet manner to recover the grinding aroma is also proposed (see, for example, Japanese Laid-Open Patent Publication No. 2000-333612, and Japanese PCT National-Phase Laid-Open Patent Publication No. 2002-511236). However, the process described in Japanese Laid-Open Patent Publication No. 2000-333612 uses drip brewing for extracting the roasted coffee beans. The drip brewing, which requires a long time to separate the liquid phase from the solid phase and thus causes quality deterioration, is not preferable for industrial production. Japanese Laid-Open Patent Publication No. 2000-333612 also describes a process of suppressing the elution of an excessive oil content by limiting the grinding particle size to a specific range. However, merely controlling the grinding particle size results in a larger amount of oil content being eluted than in the concentrated coffee extract produced by a counter-current multi-stage extraction method using a fixed bed extraction column (i.e., a commercially available concentrated coffee extract; hereinafter, occasionally referred to as the "column-extracted concentrated coffee extract"). Thus, this process cannot sufficiently suppress the elution of the oil content. Since the amount of eluted coffee oil increases in accordance with the roasting degree of the coffee beans (especially in the case of deep-roasting and dark-roasting), it is difficult to suppress the elution of the oil content by merely controlling the grinding particle size.

The process described in Japanese PCT National-Phase Laid-Open Patent Publication No. 2002-511236 adopts slurry extraction using stripping treatment as a process for extracting the roasted coffee beans. This publication describes that the slurry obtained by the stripping treatment is transferred to an extraction system, made thermally soluble, and then concentrated. However, the publication provides no description on a method for separating a liquid extracted after the slurry is made thermally soluble from the extracted residue, or on the clarification of the extracted liquid. The slurry extraction has an advantage of capable of efficiently recovering the grinding aroma but also has a problem of easily allowing an excessive oil content to elute. Japanese PCT National-Phase Laid-Open Patent Publication No. 2002-511236 does not provide any description on the control of the elution of such an excessive oil content.

For preventing the deterioration or loss of the aroma component at the time of grinding, a process of recovering the aroma component in advance before the extraction and then adding back the recovered aroma component after the extraction and concentration is known (see Japanese Laid-Open Patent Publication No. 4-287638 (patent family: U.S. Pat. No. 5,225,223) and Japanese PCT National-Phase Laid-Open Patent Publication No. 2003-507047 (patent family: U.S. Pat. No. 6,455,093)). For preventing the loss of the aroma component at the time of concentration, a process of adding the initially evaporated portion of the condensed water at the time of vaporization and concentration back to the concentrated extract is known (see Japanese Laid-Open Patent Publication No. 58-175441). However, these patent publications describe a process for producing powdered coffee, and so do not mention technological problems regarding clarification of the concentrated coffee extract, and control or prevention of precipitation of the oil content, or do not mention any means for solving the problems. In addition, the component which is added back is limited to a water-soluble component. There is no description regarding adding back an oil-soluble component.

For coffee drinks containing a dairy component, cold sweets such as ice cream and the like, and desserts such as pudding and the like, it may be occasionally preferable to contain a large amount of oil in the extract in order to enrich the flavor or thickness of taste of coffee. Therefore, a process of extracting a coffee extract by fine-grinding the roasted coffee beans such that the average particle diameter is less than 200 µm is disclosed (see Japanese Laid-Open Patent Publication No. 11-75694). However, event this process cannot sufficiently control the coffee oil content in the concentrated coffee extract, or cannot control the oil content in accordance with the quality or the roasting degree of the raw material or the application. Further, when the coffee beans are fine-ground in order to obtain a large amount of oil, there occurs a problem that the elution of excessive astringency or bitterness cannot be avoided.

DISCLOSURE OF THE INVENTION

Therefore, the present invention has a main object of providing a stable concentrated coffee extract which is rich in aroma component released when the roasted coffee beans are ground and has an amount of coffee oil controllable in accordance with the use and purpose, and a process for industrially producing the same.

As a result of accumulating active studies in order to solve the above-described problems, the present inventors found that a concentrated coffee extract having an excellent flavor is obtained by wet-grinding roasted coffee beans, separating the aroma component and coffee oil from the coffee extract before the coffee extract is concentrated, and mixing the aroma component with the post-concentration coffee extract; and that a concentrated coffee extract having a controlled amount of coffee oil is obtained by further mixing the separated coffee oil. The present invention has been made based on such knowledge.

According to a preferable embodiment of the present invention, by wet-grinding roasted coffee beans, an aroma component of roasted coffee beans, which is likely to release at the time of grinding, can be efficiently taken into the liquid; and by separating and recovering the aroma component in advance before concentrating the coffee extract, coffee aroma in a good state which is not damaged by the heating or the like at the time of coffee extract concentration can be obtained. By mixing, after the coffee extract concentration, the aroma component separated and recovered before the concentration, a concentrated coffee extract rich in aroma component with little loss or deterioration of the aroma component can be obtained.

According to another preferable embodiment of the present invention, in the step of obtaining a concentrated coffee extract, the coffee oil is separated by at least three stages of rough filtration, centrifugal separation and fine filtration to once remove the oil content. Therefore, a concentrated coffee extract having transparency and highly stable against storage can be obtained.

According to still another preferable embodiment of the present invention, by mixing the concentrated coffee extract with coffee oil of an amount suitable to the final product, a concentrated coffee extract having a content of coffee oil controllable to be suitable to various final products can be obtained.

Namely, the present invention provides a process for producing an aroma-containing clarified and concentrated coffee extract, the process comprising the steps of:

(a) adding a liquid to roasted coffee beans and wet-grinding the resultant substance to form a slurry;

(b) stripping-treating the slurry formed in step (a) to separate an aroma component-containing distillate and the stripping-treated slurry from each other;

(c) rough-filtrating the stripping-treated slurry obtained in step (b);

(d) separating the rough-filtrated filtrate obtained in step (c) into three layers of a coffee oil-containing liquid, a coffee extract and a sludge using a three-layer centrifuge;

(e) fine-filtrating the coffee extract obtained in step (d) to obtain a clarified coffee extract;

(f) concentrating the clarified coffee extract obtained in step (e) to obtain a clarified and concentrated coffee extract; and (g) mixing the clarified and concentrated coffee extract obtained in step (f) with a part of, or the entirety of, the aroma component-containing distillate obtained in step (b) to obtain the aroma-containing clarified and concentrated coffee extract.

In the above process, it is preferable that the concentration of the roasted and ground coffee beans in the slurry in step (a) including the roasted and ground coffee beans and the liquid is in the range of 3 to 30% by weight based on the total weight of the slurry. It is also preferable that the average particle diameter of the roasted and ground coffee beans in step (a) is in the range of 300 μm to 1 mm. It is further preferable that the temperature of the liquid in step (a) is in the range of 1 to 40° C.

In the above process, it is preferable that step (b) uses a continuous film distillation apparatus as a stripping-treatment apparatus. It is also preferable that the aroma component-containing distillate separated in step (b) is included in the range of 1 to 10% by weight based on the total weight of the slurry formed in step (a). It is further preferable that the fine-filtration in step (e) is filter aid filtration and/or filtering material filtration.

In the above process, steps (e) and (f) may be steps (e') and (f') described below:

(e') concentrating the coffee extract obtained in step (d) to obtain a pre-clarification concentrated coffee extract;

(f') fine-filtrating the pre-clarification concentrated coffee extract obtained in step (e') to obtain a clarified and concentrated coffee extract.

As described above, according to the present invention, a clarified and concentrated coffee extract may be produced by fine-filtrating and then concentrating the coffee extract obtained in step (d), or by concentrating and then fine-filtrating the coffee extract obtained in step (d).

The present invention provides an aroma-containing clarified and concentrated coffee extract produced in the above described process, wherein the aroma-containing clarified and concentrated coffee extract has a concentration of a soluble solid content in the range of 1 to 70% by weight, and contains a diethylether extract in an amount of equal to or less than 8% by weight based on the total weight of the soluble solid content.

The present invention provides a mixed concentrated coffee extract, comprising an aroma-containing clarified and concentrated coffee extract produced in the above-described process and a fixed bed column-extracted concentrated coffee extract obtained by a counter-current multi-stage extraction method using a fixed bed extraction column; wherein a soluble solid content derived from the aroma-containing clarified and concentrated coffee extract is equal to or higher than 5% by weight based on the total weight of a soluble solid content in the mixed concentrated coffee extract.

The present invention also provides a process for producing an oil aroma-containing concentrated coffee extract, comprising the step of:

(h) adding a part of, or the entirety of, the coffee oil-containing liquid obtained in step (d) to the aroma-containing clarified and concentrated coffee extract obtained in step (g) and homogeneously mixing the resultant substance.

The present invention provides an oil aroma-containing concentrated coffee extract produced in the above-described process, which has a concentration of a soluble solid content in the range of 1 to 70% by weight, and contains a diethylether extract in an amount in the range of 3 to 30% by weight based on the total weight of the soluble solid content.

The present invention provides a mixed concentrated coffee extract, comprising an oil aroma-containing concentrated coffee extract produced in the above-described process, and a fixed bed column-extracted concentrated coffee extract obtained by a counter-current multi-stage extraction method using a fixed bed extraction column; wherein a soluble solid content derived from the oil aroma-containing concentrated coffee extract is equal to or higher than 5% by weight based on the total weight of a soluble solid content in the mixed concentrated coffee extract.

According to a preferable embodiment of the present invention, by wet-grinding roasted coffee beans, an aroma component which roasted coffee beans have, which is likely to release at the time of grinding, can be efficiently taken into the liquid; and by separating and recovering the aroma component in advance before concentrating the coffee extract, coffee aroma in a good state which is not damaged by the heating or the like at the time of coffee extract concentration can be obtained. By mixing, after the coffee extract concentration, the aroma component separated and recovered before the concentration, a concentrated coffee extract rich in aroma component with little loss or deterioration of the aroma component can be obtained. Especially, a concentrated coffee extract containing an aroma component obtained when the coffee beans are ground can be obtained.

According to another preferable embodiment of the present invention, in the step of obtaining a concentrated coffee extract, the coffee oil is separated by at least three stages of rough filtration, centrifugal separation and fine filtration to once remove the oil component. Therefore, a concentrated coffee extract having transparency and highly stable against storage can be obtained. In addition, by mixing the concentrated coffee extract with coffee oil of an amount suitable to the final product, the content of coffee oil is controllable. Therefore, a concentrated coffee extract suitable to various final products can be obtained.

A concentrated coffee extract having little oil obtained by the present invention is especially suitable to uses of drinks containing no dairy component, drinks, jelly or the like required to be transparent, and has a sufficient amount of aroma component of coffee. By contrast, a concentrated coffee extract containing oil obtained by the present invention is suitable to coffee drinks containing a dairy component, cold sweets such as ice cream and the like, desserts such as pudding and the like, and has an excellent flavor and is enriched in tastiness, especially in thickness of taste.

BEST MODE FOR CARRYING OUT THE INVENTION

Figure 1:
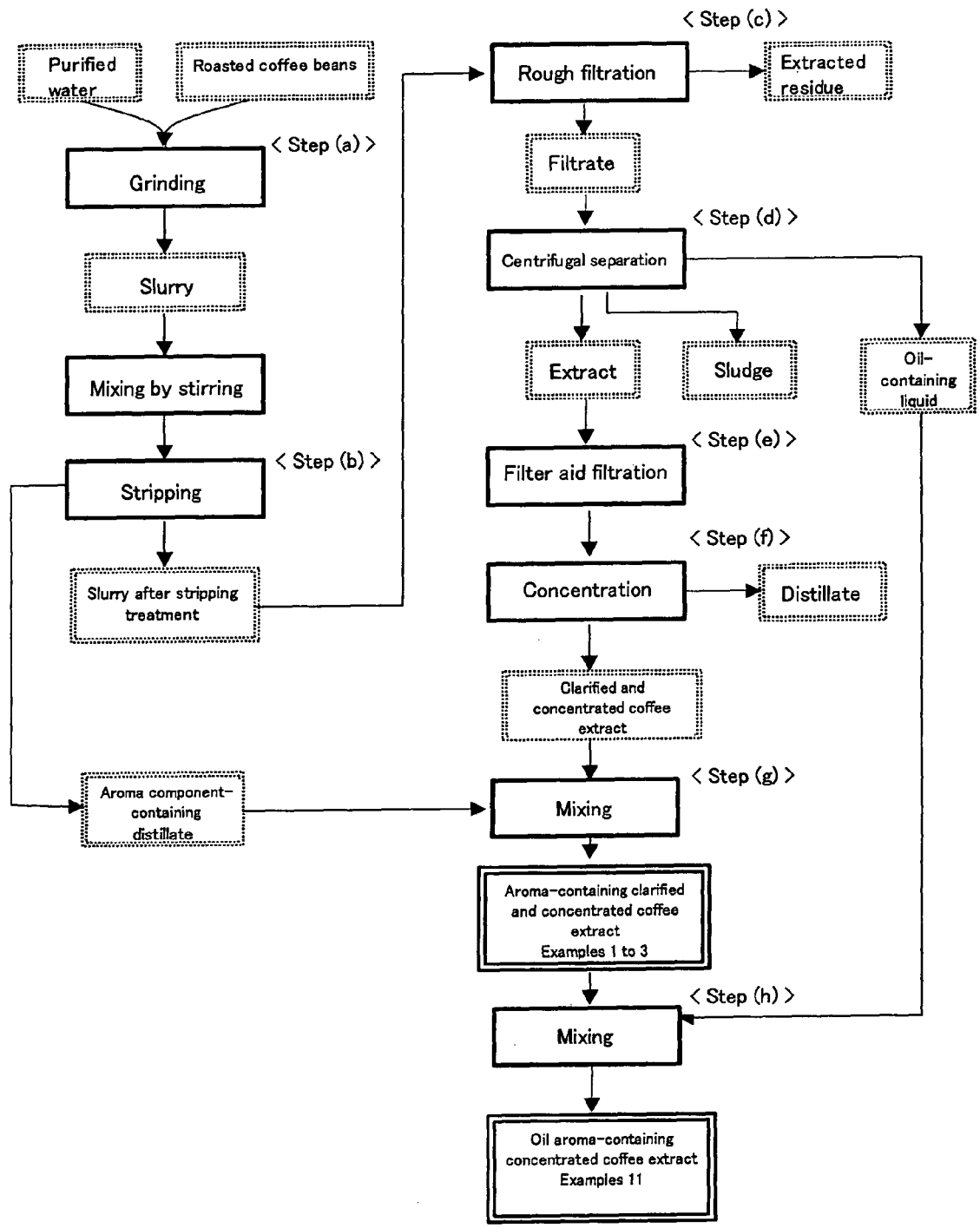
FIG. 1 is an exemplary flowchart of production of a concentrated coffee extract according to the present invention.

Hereinafter, embodiments of the present invention will be described. Herein, a "concentrated coffee extract" encompasses an aroma-containing clarified and concentrated coffee extract and an oil aroma-containing concentrated coffee extract. The aroma-containing clarified and concentrated coffee extract is transparent with only a low oil content, whereas the oil aroma-containing concentrated coffee extract has an effective amount of coffee oil. Hereinafter, a process for producing each concentrated coffee extract will be described in detail.

A. Process for Producing an Aroma-Containing Clarified and Concentrated Coffee Extract First, a process for producing an aroma-containing clarified and concentrated coffee extract will be described. A process for producing an aroma-containing clarified and concentrated coffee extract according to the present invention is to separate, from a slurry obtained by wet-grinding roasted coffee beans, an aroma component-containing distillate, a coffee oil-containing liquid and a coffee extract; and adding back the aroma component-containing distillate after the coffee extract is concentrated. A process for producing an aroma-containing clarified and concentrated coffee extract according to the present invention is provided in two embodiments. Hereinafter, each embodiment will be described.

1. First Embodiment

A process for producing an aroma-containing clarified and concentrated coffee extract in a first embodiment according to the present invention comprises the steps of:

(a) adding a liquid to roasted coffee beans and wet-grinding the resultant substance to form a slurry;

(b) stripping-treating the slurry formed in step (a) to separate an aroma component-containing distillate and the stripping-treated slurry from each other;

(c) rough-filtrating the stripping-treated slurry obtained in step (b);

(d) separating the rough-filtrated filtrate obtained in step (c) into three layers of a coffee oil-containing liquid, a coffee extract and a sludge using a three-layer centrifuge;

(e) fine-filtrating the coffee extract obtained in step (d) to obtain a clarified coffee extract;

(f) concentrating the clarified coffee extract obtained in step (e) to obtain a clarified and concentrated coffee extract; and (g) mixing the clarified and concentrated coffee extract obtained in step (f) with a part of, or the entirety of, the aroma component-containing distillate obtained in step (b) to obtain the aroma-containing clarified and concentrated coffee extract. Hereinafter, each step will be described.

<Step (a)>

First, step (a) will be described. Step (a) is to add a liquid to roasted coffee beans and wet-grind the resultant substance to form a slurry. The roasted coffee beans used for the present invention are obtained by roasting green coffee beans. The type of the green coffee beans is not specifically limited to robusta, arabica, or the like and two or more types may be blended.

The green coffee beans are used after being roasted. The roasting conditions and the roasting apparatus may be any known apparatus and conditions, which may be appropriately selected in accordance with a desired type of concentrated coffee extract. For example, the roasting degree may be in the L value range of 16 to 32. The roasting apparatus may be, for example, of an open fire, semi hot wave, or hot wave system. As the green coffee beans, whole beans are desirable because of the excellent aroma of the recovered aroma component thereof.

The grinding of the roasted coffee beans in step (a) according to the present invention is performed in a wet system. The "wet-grinding" refers to grinding roasted coffee beans in a liquid such as a solvent or the like. However, roasted coffee beans, especially whole beans, contain carbon dioxide and thus cannot be easily sunk in the liquid completely and tend to float on the liquid surface. Therefore, it is preferable to introduce the roasted coffee beans and the liquid to the grinding apparatus at the same time and continuously grind the coffee beans in the state where the coffee beans are mixed with the liquid. Examples of the grinding apparatus usable for this purpose include a Fitzmill (produced by Fitzpatrick) and a Comitrol (produced by Urschel).

The "liquid" usable in this step is, for example, water such as city water, ion-exchanged water, deoxidized water, purified water or the like; an aqueous solution obtained by adding a solvent such as ethanol, glycerin or the like to water; an aqueous solution obtained by adding a stabilizer such as xanthan gum, Arabic gum or the like to water; an aqueous solution obtained by adding an emulsifier such as sucrose fatty acid ester or the like; an aqueous solution containing a pH adjusting agent such as baking soda or the like; or a coffee extract. An appropriate liquid may be selected in accordance with the purpose. There is no specific limitation in the type of coffee extract usable here. A coffee extract obtained by a usual method, a commercially available extract, or an extract obtained from the slurry after the stripping treatment is usable.

The concentration of the roasted and ground coffee beans in the slurry including the roasted and ground coffee beans and the liquid, based on the total weight of the slurry, is preferably in the range of 3 to 30% by weight, more preferably in the range of 5 to 20% by weight, and still more preferably in the range of 8 to 15% by weight. When the concentration is lower than the above range, the coffee extract to be concentrated has too low a concentration and requires a long time to be concentrated. This may not be preferable from the viewpoint of the quality of the coffee extract and the production cost. When the concentration is higher than the above range, the amount of the obtained coffee extract is small and the yield of the soluble solid content is low, which may not be preferable. The amount of the liquid which is mixed at the time of wet-grinding may be the entirety of, or a part of, the liquid to be used in the process. An appropriate amount may be selected from the viewpoint of the difference in the particle size of the roasted and ground coffee beans among different grinding apparatuses, the treating speed, or the like. In order to capture a sufficient amount of aroma component released at the time of grinding in step (b), it is preferable to mix 50% by weight or more of the entire liquid at the time of grinding. When the entirety of the liquid is not mixed at the time of wet-grinding, the remaining liquid may be added before the stripping treatment in step (b) to adjust the slurry.

The average particle diameter of the wet-ground roasted coffee beans (also referred to as "roasted and ground coffee beans") is preferably in the range of 300 μm to 1 mm, and more preferably in the range of 700 μm to 980 μm. When the average particle diameter is smaller than the above range, it is difficult to separate the solid phase and the liquid phase from each other by the rough filtration in step (c). This may affect the steps (d) and (e), and as a result, it may become difficult to industrially obtain a clarified coffee extract. By contrast, when the average particle diameter is larger than the above range, the precipitating speed of the ground coffee in the slurry becomes too high. In this case, the roasted and ground coffee beans and the liquid are likely to be separated from each other, and it becomes difficult to maintain the slurry homogeneous. This causes a problem of clogging or the like in the production line, which may not be preferable to stably produce the clarified and concentrated coffee extract. The average particle diameter of the roasted and ground coffee beans can be measured by a laser diffraction/scattering particle size distribution measuring apparatus, for example, HORIBA LA-920 (produced by HORIBA, Ltd.).

The temperature of the liquid is preferably in the range of 1 to 40° C., more preferably in the range of 5 to 30° C., and still more preferably in the range of 15 to 25° C. As the temperature of the liquid is lower, the solubility of the aroma component, which is volatile, is higher and thus a larger amount of the aroma component is captured in the liquid. Therefore, a lower temperature of the liquid is more preferable. An appropriate temperature may be selected based on the balance between the cost for lowering the temperature of the liquid down to less than room temperature and the effect of capturing the aroma component obtained by lowering the temperature. Herein, the "temperature of the liquid" referred to the temperature at the time of wet-grinding and thus is the same as the temperature of the slurry to be obtained.

<Step (b)>

Next, step (b) will be described. Step (b) is to perform stripping treatment on the slurry formed in step (a) to separate an aroma component-containing distillate and the stripping-treated slurry from each other.

Herein, the "stripping treatment" refers to a treatment of putting a heat source and the slurry into contact with each other in a counter-current manner for rectification and thus concentrating a volatile component contained in the slurry into a gas phase. According to the present invention, it is preferable to use a continuous film distillation apparatus capable of continuously supplying the slurry and having a high heat transfer coefficient. Examples of the continuous film distillation apparatus include an SCC (Spinning Cone Column) (produced by Flavortech).

According to the present invention, by the stripping treatment, aroma component concentrated into a gas phase is condensed to obtain an aroma component-containing distillate. For condensing, any known cooling method and cooling apparatus may be used. There is no specific limitation in the cooling temperature. An aroma component can usually be condensed by being cooled to a temperature in the range of 1 to 15° C.

The ratio of the aroma component-containing distillate recovered by the stripping treatment, based on the total weight of the slurry formed in step (a), is preferably in the range of 1 to 10% by weight, more preferably in the range of 1.5 to 6% by weight, and still more preferably in the range of 2 to 5% by weight. When the ratio is lower than the above range, a sufficient amount of aroma component cannot be recovered, which may not be preferable. When the ratio is higher than the above range, the aroma strength of the recovered aroma component-containing distillate is weak. When such an aroma component-containing distillate is added to the clarified and concentrated coffee extract, the effect of providing the aroma is reduced, which may not be preferable. According to the present invention, the recovering amount of the aroma component-containing distillate can be adjusted by the amount of the heat source with respect to the slurry supplied to the stripping apparatus, the vacuum degree in the stripping atmosphere, or the like.

The temperature of the stripping treatment can be arbitrarily selected from the range in which industrial operations are possible. From the viewpoint of the ease of condensing the aroma component and the ease of the operation of obtaining a coffee extract from the slurry after the stripping treatment, a temperature in the range of about 70 to 130° C. is preferable.

<Step (c)>

Next, step (c) will be described. Step (c) is to rough-filtrate the slurry separated by the stripping treatment in step (b) to separate a solid phase and a liquid phase from each other. In this step, rough filtration may be performed by any of gravity separation, pressure separation and centrifugal separation respectively using, for example, a vibration sieve, a screw press, and a screw decanter. An apparatus continuously operable is preferable. For the separation into a solid phase and a liquid phase in step (c), it is preferable that the roasted and ground coffee bean particles having a diameter of 800 μm or greater as an extract residue are separated.

<Step (d)>

Next, step (d) will be described. Step (d) is to separate the rough-filtrated filtrate obtained in step (c) into three layers of a coffee oil-containing liquid, a coffee extract and a sludge using a three-layer centrifuge.

Namely, step (d) is to remove a sludge formed of, for example, fine powder of the roasted and ground coffee beans, which cannot be removed by the rough filtration, from the rough-filtrated filtrate obtained in step (c), and to separate the coffee oil-containing liquid at the same time as the sludge removal, thus to obtain a coffee extract having only a little content of coffee oil.

Centrifugal separation is preferably performed by a separation plate-type, or sharpless-type centrifuge, which can be continuously operated and can separate the filtrate into three layers. When a target level of the coffee oil content or the fine powder remaining in the coffee extract after the centrifugal separation is not obtained, the conditions of the temperature, speed, processing number of times and the like may be appropriately changed for another cycle of centrifugal separation.

<Step (e)>

Step (e) will be described. Step (e) is to fine-filtrate the coffee extract obtained in step (d) to obtain a clarified coffee extract. The fine filtration is performed in order to remove the fine powder or coffee oil, which cannot be removed by the centrifugal separation, from the coffee extract.

The fine filtration may be performed in two methods, i.e., a filter aid filtration using a filter aid and a filtering material filtration using a filtering material. An appropriate method may be optionally selected. Both of the filter aid filtration and the filtering material filtration may be performed in combination. When the two methods are performed in combination, the order thereof may be arbitrarily selected. The fine filtration step according to the present invention is the second filtration which is performed after the rough filtration, and may be referred to also as the "secondary filtration step". Optionally, adsorption treatment may be performed using a known adsorbing agent such as PVPP (polyvinylpolypyrrolidone), activated white earth or the like, before or after the fine filtration step. By this step, a specific component, for example, caffeine or tannin can be selectively removed from the coffee extract.

The filter aid filtration according to the present invention may be performed using a filtration apparatus arbitrarily selected from apparatuses generally used for filtration including drum-type, horizontal-type, filter-press, roll-press, and leaf-like apparatuses. The post-treatment clearness can be controlled by selecting a type of filter aid from diatomite, perlite, cellulose, activated carbon and the like which are generally usable for food industry, an amount thereof, or both the type and the amount.

The filtering material filtration in this step may be performed using a method arbitrarily selected from methods generally used for filtering material filtration. For example, a method using a microstrainer, membrane filtration, deep filtration or the like is usable.

Among these methods, a filtering material usable for the microstrainer may be nonwoven cloth, paper filter, metal or the like. A filtering material usable for membrane filtration may be an inorganic membrane formed of ceramics, metal or the like; or an organic membrane formed of polycarbonate, polyimide or the like. A filter usable for deep filtration may be, for example, of a pleat type, a spool type, or a porous type. These types of filters can be usable in a cartridge system. These types of filters are formed of polypropylene, polyester, cotton, nylon, cellulose or the like. Especially when membrane filtration is performed in step (e), a UF membrane or an MF membrane is preferably used.

<Step (f)>

Next, step (f) will be described. Step (f) is to concentrate the clarified coffee extract obtained in step (e) to obtain a clarified and concentrated coffee extract. A concentrator usable for the concentration in step (f) may be arbitrarily selected from concentrators usually used for coffee extract concentration including a centrifugal film concentrator, a flash vaporizer, a falling film evaporator, a freezing concentrator, and a reverse osmosis concentrator. Among these, according to the present invention, the centrifugal film concentrator is preferable from the viewpoint of the running cost and the quality. Examples of the centrifugal film concentrator include a Centritherm evaporator (produced by FT Industrial). The treating temperature for the concentration is preferably in the range of 40 to 70° C. in order to avoid deterioration due to heat during the concentration, and more preferably in the range of 45 to 65° C., and still more preferably in the range of 50 to 60° C. The concentration of the soluble solid content in the clarified and concentrated coffee extract may be appropriately selected based on the balance of the transportation cost and the product quality. The concentration is adjusted to be usually in the range of 1 to 70% by weight, preferably in the range of 5 to 60% by weight, and more preferably in the range of 10 to 50% by weight, based on the total weight of the clarified and concentrated coffee extract.

In order to reduce the viscosity, reduce the amount of coagulated precipitate, or the like, enzyme treatment may be performed using mannase, protease or the like before or after the concentration step. In order to improve the tastiness or stability, pH adjustment may be performed using baking soda or sodium hydroxide before or after the concentration step.

Especially when the enzyme treatment is performed, the enzyme is deactivated by heating after the enzyme treatment. Such heating may cause precipitation in the coffee extract. In order to remove the precipitate, centrifugal separation or fine filtration using a filter aid or a filtering material may be performed after the enzyme is deactivated by heating. Such methods for removing the precipitate may be performed in combination.

<Step (g)>

Next, step (g) will be described. Step (g) is to mix the clarified and concentrated coffee extract obtained in step (f) with the aroma component-containing distillate obtained in step (b) to obtain the aroma-containing clarified and concentrated coffee extract. The amount of the aroma component-containing distillate to be mixed may be the entirety of, or a part of, the amount obtained in step (b), and may be appropriately selected in accordance with the use of the concentrated coffee extract.

2. Second Embodiment

Next, a process for producing an aroma-containing clarified and concentrated coffee extract in a second embodiment will be described. The process for producing an aroma-containing clarified and concentrated coffee extract in the second embodiment according to the present invention comprises the steps of:

(a) adding a liquid to roasted coffee beans and wet-grinding the resultant substance to form a slurry;

(b) stripping-treating the slurry formed in step (a) to separate an aroma component-containing distillate and the stripping-treated slurry from each other;

(c) rough-filtrating the stripping-treated slurry obtained in step (b);

(d) separating the rough-filtrated filtrate obtained in step (c) into three layers of a coffee oil-containing liquid, a coffee extract and a sludge using a three-layer centrifuge;

(e') concentrating the coffee extract obtained in step (d) to obtain a pre-clarification concentrated coffee extract;

(f') fine-filtrating the pre-clarification concentrated coffee extract obtained in step (e') to obtain a clarified and concentrated coffee extract; and (g) mixing the clarified and concentrated coffee extract obtained in step (f') with a part of, or the entirety of, the aroma component-containing distillate obtained in step (b) to obtain the aroma-containing clarified and concentrated coffee extract.

In the second embodiment, the coffee extract obtained in step (d) is concentrated in step (e') and then fine-filtrated in step (f') to produce a clarified and concentrated coffee extract. Thus, in the second embodiment, steps (e') and (f') are performed instead of steps (e) and (f) in the first embodiment. The other steps (a) to (d) and (g) are the same as those of the first embodiment and will not be described again. Hereinafter, steps (e') and (f') will be described.

<Step (e')>

Step (e') is to concentrate the coffee extract obtained in step (d) to obtain a pre-clarification concentrated coffee extract. The concentrator usable in this step may be any of those mentioned for step (f) in the first embodiment as examples. A preferable concentrator is the same as described above. The treatment temperature at the time of concentration is preferably in the range of 40 to 70° C., more preferably in the range of 45 to 65° C., and still more preferably in the range of 50 to 60° C. for substantially the same reasons as those for step (f). The concentration of the soluble solid content in the pre-clarification concentrated coffee extract, based on the total weight of the pre-clarification concentrated coffee extract, is usually in the range of 1 to 70% by weight, preferably in the range of 5 to 60% by weight, and more preferably in the range of 10 to 50% by weight.

As in step (f), in order to reduce the viscosity, reduce the amount of coagulated precipitate, or the like, enzyme treatment may be optionally performed before or after the concentration step. In order to improve the tastiness or stability, pH adjustment may also be performed before or after the concentration step. When precipitation is caused by the enzyme treatment, it is preferable to remove the precipitate by performing centrifugal separation or fine filtration using a filter aid or a filtering material. The fine filtration may also be used as the fine filtration in step (f') described below.

<Step (f')>

Next, step (f') will be described. Step (f') is to fine-filtrate the pre-clarification concentrated coffee extract obtained in step (e') to obtain a clarified and concentrated coffee extract. By this step, the fine powder or coffee oil, which cannot be removed by the centrifugal separation in step (d), can be removed from the coffee extract. As described above, the fine filtration may be performed in two methods, i.e., a filter aid filtration and a filtering material filtration. These methods may be performed independently or in a combination. An appropriate method for the fine filtration may be selected for the purpose or the like. The details of the fine filtration are as described above regarding step (e).

In the above-described manner, an aroma-containing clarified and concentrated coffee extract is obtained. According to the present invention, an aroma component can be efficiently obtained by stripping-treating the slurry obtained by wet-grinding. Before the coffee extract is obtained, the aroma component is captured (step (b)), and the aroma component obtained in step (b) is added back to the clarified and concentrated coffee extract obtained in step (f) or (f'). Owing to this, the loss or deterioration of the aroma component, which is caused when the coffee extract is concentrated by the conventional methods, can be suppressed. As a result, an aroma-containing clarified and concentrated coffee extract having an excellent aroma can be obtained. In addition, the separation operation is performed at least in three stages in steps (c), (d) and (e) or (f'), and the coffee oil-containing liquid is separated from the coffee extract in step (d). Owing to this, the aroma-containing clarified and concentrated coffee extract obtained according to the present invention contains almost no coffee oil component. Therefore, a transparent and stable aroma-containing clarified and concentrated coffee extract which causes almost no separation or coagulation after being stored for a long time is obtained. According to the present invention, even when the eluted amount of coffee oil is increased or decreased by the roasting degree or the particle size of the ground coffee beans, such a change can be compensated for by appropriately changing the conditions of the centrifugal separation or fine filtration.

(Aroma-Containing Clarified and Concentrated Coffee Extract)

The concentration of the soluble solid content in the aroma-containing clarified and concentrated coffee extract according to the present invention is preferably in the range of 1 to 70% by weight, more preferably in the range of 5 to 60% by weight, and still more preferably in the range of 10 to 50% by weight.

In the present invention, the "soluble solid content" refers to a substance which is dissolved in each type of concentrated coffee extract according to the present invention and obtained as a solid for drying the liquid (extract). The concentration of the soluble solid content is represented as the amount (% by weight) based on the total weight of each type of concentrated coffee extract.

A preferable content of the coffee oil in the aroma-containing clarified and concentrated coffee extract according to the present invention varies in accordance with the type of the raw material coffee beans, the roasting degree, the roasting method or the like. The amount of dithylether extract in the aroma-containing clarified and concentrated coffee extract, based on the solid soluble content in the aroma-containing clarified and concentrated coffee extract, is preferably equal to or lower than 8% by weight, more preferably equal to or lower than 5% by weight, and still more preferably equal to or lower than 3% by weight.

(Mixed Concentrated Coffee Extract)

The aroma-containing clarified and concentrated coffee extract according to the present invention may be mixed with a fixed bed column-extracted concentrated coffee extract obtained by a counter-current multi-stage extraction method using a fixed bed extraction column, to form a mixed concentrated coffee extract.

The commercially available conventional concentrated coffee extract (referring to the fixed bed column-extracted concentrated coffee extract) is obtained by counter-current multi-stage extraction using a fixed bed extraction column and is poor in the aroma component. According to the present invention, the aroma-containing clarified and concentrated coffee extract obtained by the above method, which has features of being rich in aroma component and containing an abundance of grinding aroma of coffee beans in the aroma component, is mixed with the conventional fixed bed column-extracted concentrated coffee extract. By this, the aroma of the conventional concentrated coffee extract can be improved. The aroma-containing clarified and concentrated coffee extract obtained by the above method is mixed such that the amount of the soluble solid content derived from the aroma-containing clarified and concentrated coffee extract obtained by the above method, based on the total weight of the soluble solid content in the post-mixing concentrated coffee extract (mixed concentrated coffee extract), is equal to or higher than 5% by weight, and preferably equal to or higher than 10% by weight. The amount to be mixed may be appropriately determined in accordance with the type of the raw material coffee beans, the roasting degree, the roasting method, the use or the like.

B. Process for Producing an Oil Aroma-Containing Concentrated Coffee Extract

Next, a process for producing an oil aroma-containing concentrated coffee extract will be described.

A process for producing an oil aroma-containing concentrated coffee extract according to the present invention further comprises, in addition to steps (a) through (g) described in the section "A. Process for producing an aroma-containing clarified and concentrated coffee extract" above, the step of:

(h) adding a part of, or the entirety of, the coffee oil-containing liquid obtained in step (d) to the aroma-containing clarified and concentrated coffee extract obtained in step (g) and homogeneously mixing the resultant substance.

According to the present invention, in the mixing step (h), a part of, or the entirety of, the coffee oil-containing liquid obtained in step (d) is added back to the aroma-containing clarified and concentrated coffee extract obtained in step (g). Owing to this, the deterioration of the concentrated coffee extract caused by excessive oil is prevented, and the coffee oil content can be adjusted in accordance with the use. Therefore, a concentrated coffee extract which is rich in aroma component and is enriched in tastiness and thickness can be obtained.

In this manner, according to the present invention, two types of concentrated coffee extracts, i.e., a concentrated coffee extract having a high content of coffee oil and a concentrated coffee extract having a suppressed content of coffee oil can be obtained by one industrial production process. According to the method of the present invention, it is not necessary to adjust the grinding particle size or the amount in order to suppress the elution of excessive coffee oil. Therefore, the aroma and other components inherent in coffee can be sufficiently extracted. It is not necessary either to make the grinding particle size excessively small in order to elute a large amount of coffee oil. Therefore, excessive elution of the extra components, which cause astringency or bitterness, does not occur.

According to the above-described method, after the aroma component-containing distillate is mixed with the clarified and concentrated coffee extract, the coffee oil is added back. Alternatively, the step of mixing the aroma component-containing distillate may be performed after the coffee oil-containing liquid is added and homogeneously mixed with the clarified and concentrated coffee extract. Specifically, a part of, or the entirety of, the coffee oil-containing liquid obtained in step (d) may be added to the clarified and concentrated coffee extract obtained in step (f) or (f') and homogeneously mixed, and then the aroma component-containing distillate obtained in step (b) may be mixed to obtain an oil aroma-containing concentrated coffee extract.

The ratio of the coffee oil content to be added back is preferably adjusted in accordance with the use, and the ratio based on the total weight of the oil aroma-containing concentrated coffee extract obtained in step (h) is usually in the range of 0.01 to 20% by weight, preferably in the range of 0.05 to 10% by weight, and more preferably in the range of 0.1 to 5% by weight.

In the step of adding back a part of, or the entirety of, the coffee oil-containing liquid, coffee oil extracted from the coffee oil-containing liquid by a method of solvent extraction, super-critical level fluid extraction or the like may be added back. In this case, the ratio of the extracted coffee oil to be added back is preferably adjusted in accordance with the use as well as the type of the coffee beans, the roasting degree or the grinding particle size. The ratio of the extracted coffee oil to be added back, based on the total weight of the oil aroma-containing concentrated coffee extract, is usually in the range of 0.005 to 10% by weight, preferably in the range of 0.025 to 5% by weight, and more preferably in the range of 0.05 to 2.5% by weight.

Also according to the present invention, an oil aroma-containing concentrated coffee extract may be obtained by adding the coffee oil-containing liquid or coffee oil extracted from the coffee oil-containing liquid to the clarified and concentrated coffee extract obtained in step (f) or (f'), mixing the resultant substance homogeneously, and then mixing an aroma component-containing distillate to the resultant mixture. This method is preferable from the viewpoint of the storability of the aroma component in the obtained concentrated coffee extract.

There is no specific limitation in the method for homogeneously mixing the coffee oil-containing liquid to the aroma-containing clarified and concentrated coffee extract, and a method of mixing using a high speed stirring apparatus, a high pressure homogenizer or the like is usable. At this point, a stabilizer or an emulsifier usable for food, such as carrageenan, xanthan gum, sucrose fatty acid ester or the like may be optionally added. Herein, the phrase "homogeneously mix" refers to mixing to a degree at which the aroma-containing clarified and concentrated coffee extract and the coffee oil are not separated from each other. The above phrase refers to, for example, mixing at 1500 rpm to 10000 rpm for 10 to 40 minutes using a TK mixer (produced by Tokushukika Kogyo K.K.) to prepare a homogenized concentrated coffee extract.

The coffee oil-containing liquid obtained in step (d) according to the present invention contains coffee oil, water, a trace amount of protein and the like. By quantitatively analyzing the oil content in the liquid, the amount of the coffee oil content can be specified when the coffee oil-containing liquid is added back to the aroma-containing clarified and concentrated coffee extract. Various methods are usable for quantitatively analyzing the coffee oil. According to the present invention, a component extracted as a diethylether phase by a liquid-liquid extraction method using diethylether (i.e., a diethylether extract) is defined as the coffee oil.

As described above, according to the process for producing a concentrated coffee extract of the present invention, an aroma component, which is easily deteriorated, is first extracted, and then the extracted is clarified and concentrated. Alternatively, an aroma component, which is easily deteriorated, is first extracted, and then the extracted is concentrated and clarified. After a stable concentrated coffee extract is obtained but before the concentration, a part of, or the entirety of, the aroma component-containing distillate obtained by the stripping treatment and a part of, or the entirety of, the coffee oil-containing liquid obtained during the process are added back. In this manner, an optimum concentrated coffee extract suitable for the intended tastiness or the use of the coffee extract is obtained. The obtained concentrated coffee extract has an excellent balance of aroma, tastiness and thickness.

(Oil Aroma-Containing Concentrated Coffee Extract)

In the oil aroma-containing concentrated coffee extract according to the present invention obtained in this manner, the concentration of the soluble solid content is usually in the range of 1 to 70% by weight, preferably in the range of 5 to 60% by weight, and more preferably in the range of 10 to 50% by weight.

The content of the coffee oil in the oil aroma-containing concentrated coffee extract according to the present invention significantly varies in accordance with the type of the raw material coffee beans, the roasting degree, the roasting method or the like, and is appropriately adjusted in accordance with the use. The amount of the diethylether extract of the oil aroma-containing concentrated coffee extract based on the soluble solid content in the oil aroma-containing concentrated coffee extract is preferably in the range of 3 to 30% by weight, more preferably in the range of 5 to 15% by weight, and more preferably in the range of 8 to 12% by weight.

By concentrating the coffee extract to contain the soluble solid content in the above range, the cost for transportation and storage can be reduced. By containing the diethylether extract in the above range, a coffee extract enriched in tastiness and thickness can be obtained. Such a coffee extract is desirable as an industrial product in terms of price and quality.

(Mixed Concentrated Coffee Extract)

The present invention can also provide a mixed concentrated coffee extract obtained by mixing the oil aroma-containing concentrated coffee extract according to the present invention and a fixed bed column-extracted concentrated coffee extract obtained by a counter-current multi-stage extraction method using a fixed bed extraction column. In such a mixed concentrated coffee extract, in which the soluble solid content derived from the oil aroma-containing concentrated coffee extract based on the total weight of the soluble solid content in the mixed concentrated coffee extract is equal to or higher than 5% by weight and preferably equal to or higher than 10% by weight.

In the above-described manner, an aroma-containing clarified and concentrated coffee extract, an oil aroma-containing concentrated coffee extract, and a mixed concentrated coffee extract containing each of these and a fixed bed column-extracted concentrated coffee extract can be obtained. The concentrated coffee extract and the mixed concentrated coffee extract obtained according to the present invention can be contained in various foods and drinks. The concentrated coffee extract and the mixed concentrated coffee extract obtained according to the present invention can be diluted to an appropriate concentration suitable to, and contained in, various drinks described below. For example, coffee drinks which can contain the concentrated coffee extract or the mixed concentrated coffee extract obtained according to the present invention include sugar-free black coffee; sugar-added black coffee containing sucrose, liquid sugar, a sweetener or the like; café au lait type coffee drinks containing a dairy component such as milk, powdered skim milk, fresh cream or the like added to sugar-free black coffee or sugar-added black coffee; or the like. These drinks are put into containers such as bottles, cans, PET bottles, paper packs, pouches or the like, and then heated or cooled to be provided to drinking.

Especially, a concentrated coffee extract containing no coffee oil according to the present invention (aroma-containing clarified and concentrated coffee extract) has stable transparency and so is optimum for black coffee drinks to be put into transparent bottlers or PET bottles. A concentrated coffee extract according to the present invention containing coffee oil to have enriched tastiness (oil aroma-containing concentrated coffee extract) is optimum for coffee drinks containing a dairy component.

Examples of other foods and drinks containing the concentrated coffee extract or the mixed concentrated coffee extract obtained according to the present invention include coffee-flavored cold sweets and chilled desserts such as jelly, pudding, ice cream, iced candies and the like; and coffee-flavored confectionary and baked foods such as cakes, candies, cookies, bread and the like. Especially, a concentrated coffee extract containing no coffee oil according to the present invention (aroma-containing clarified and concentrated coffee extract) has stable transparency and so is optimum for coffee jelly required to be transparent. A concentrated coffee extract according to the present invention containing coffee oil to have enriched tastiness, especially thickness (oil aroma-containing concentrated coffee extract) is optimum for pudding, ice cream, cakes, cookies and the like.

EXAMPLES

Hereinafter, the present invention will be described by way of specific examples, but the present invention is not limited by these examples in any way.

Example 1

Roasted Colombia coffee beans (produced by Takasago Coffee Co., Ltd.) were supplied to a grinding apparatus (Comitrol, produced by Urschel) at a rate of 450 kg/hour, and purified water was supplied to the grinding apparatus at rate of 2,550 kg/hour. The temperature of the resultant slurry was 25° C., and the average. particle diameter obtained by grinding was 960 μm. The average particle diameter was measured by a laser diffraction/scattering particle size distribution measuring apparatus (HORIBA LA-920, produced by HORIBA, Ltd.).

The resultant slurry was supplied to a continuous film distillation apparatus (produced by Flavortech) at a rate of 3,000 L/hour while being stirred in a stirring tank at a rate sufficient to maintain the state in which the roasted and ground coffee beans were homogeneously dispersed. Water vapor was supplied from below the stripping column such that the temperature would be 95° C. and the ratio of the recovered aroma component-containing distillate would be 4% by weight with respect to the supplied slurry under a condition of atmospheric pressure. The resultant aroma component-containing distillate was cooled to about 4° C. and stored in a sealed state. The slurry discharged from the stripping column was supplied to a screw press (produced by Flavortech) and rough-filtrated. The filtrate obtained by the rough filtration was supplied to a disk centrifuge (Alfa Laval K.K.) at a rate of 2,500 L/hour to be separated into a coffee extract, a coffee oil-containing liquid, and a sludge containing fine powder of ground coffee.

Next, the coffee extract obtained by the centrifugal separation was treated with filter aid filtration using a horizontal filtrating plate-type filtration apparatus and diatomite, to remove the fine powder of ground coffee and the oil component. The clarified extract obtained by the filter aid filtration (clarified coffee extract) was supplied to a Centritherm (produced by FT Industrial) at a rate of 2,500 L/hour and concentrated at 50° C. The resultant clarified and concentrated coffee extract and the aroma component-containing distillate were mixed at a ratio of the clarified and concentrated coffee extract:the aroma component-containing distillate=4:1 (by weight) to obtain a concentrated coffee extract (aroma-containing clarified and concentrated coffee extract) having a soluble solid content of 20% by weight. FIG. 1 is a flowchart of the production.

Example 2

An aroma-containing clarified and concentrated coffee extract was obtained in substantially the same manner as in Example 1 except that Brazil Arabica coffee beans were used.

Example 3

An aroma-containing clarified and concentrated coffee extract was obtained in substantially the same manner as in Example 1 except that Mocha coffee beans were used.

Example 4

Roasted Brazil Arabica coffee beans (produced by Takasago Coffee Co., Ltd.) were supplied to a grinding apparatus (Comitrol, produced by Urschel) at a rate of 450 kg/hour, and purified water was supplied to the grinding apparatus at rate of 2,550 kg/hour. The temperature of the resultant slurry was 25° C., and the average particle diameter obtained by grinding was 960 μm. The average particle diameter was measured by a laser diffraction/scattering particle size distribution measuring apparatus (HORIBA LA-920, produced by HORIBA, Ltd.).

The resultant slurry was supplied to a continuous film distillation apparatus (produced by Flavortech) at a rate of 3,000 L/hour while being stirred in a stirring tank at a rate sufficient to maintain the state in which the roasted and ground coffee beans were homogeneously dispersed. Water vapor was supplied from below the stripping column such that the temperature would be 95° C. and the ratio of the recovered aroma component-containing distillate would be 4% by weight with respect to the supplied slurry under a condition of atmospheric pressure. The resultant aroma component-containing distillate was cooled to about 4° C. and stored in a sealed state. The slurry discharged from the stripping column was supplied to a screw press (produced by Flavortech) and rough-filtrated. The filtrate obtained by the rough filtration was supplied to a disk centrifuge (Alfa Laval K.K.) at a rate of 2,500 L/hour to be separated into a coffee extract, a coffee oil-containing liquid, and a sludge containing fine powder of ground coffee.

Next, the coffee extract obtained by the centrifugal separation was treated with filtering material filtration using a ceramic membrane to remove the fine powder of ground coffee and the oil component. The clarified extract obtained by the filtering material filtration (clarified coffee extract) was supplied to an Evapole (produced by Ohkawara Kakouki Co., Ltd.) and concentrated at 50° C. The resultant clarified and concentrated coffee extract and the aroma component-containing distillate were mixed at a ratio of the clarified and concentrated coffee extract:the aroma component-containing distillate=4:1 (by weight) to obtain a concentrated coffee extract (aroma-containing clarified and concentrated coffee extract) having a soluble solid content of 20% by weight.

Example 5

Roasted Brazil Arabica coffee beans (produced by Takasago Coffee Co., Ltd.) were supplied to a grinding apparatus (Comitrol, produced by Urschel) at a rate of 450 kg/hour, and purified water was supplied to the grinding apparatus at rate of 2,550 kg/hour. The temperature of the resultant slurry was 25° C., and the average particle diameter obtained by grinding was 960 μm. The average particle diameter was measured by a laser diffraction/scattering particle size distribution measuring apparatus (HORIBA LA-920, produced by HORIBA, Ltd.).

The resultant slurry was supplied to a continuous film distillation apparatus (produced by Flavortech) at a rate of 3,000 L/hour while being stirred in a stirring tank at a rate sufficient to maintain the state in which the roasted and ground coffee beans were homogeneously dispersed. Water vapor was supplied from below the stripping column such that the temperature would be 95° C. and the ratio of the aroma component-containing distillate would be 4% by weight with respect to the supplied slurry under a condition of atmospheric pressure. The resultant aroma component-containing distillate was cooled to about 4° C. and stored in a sealed state. The slurry discharged from the stripping column was supplied to a screw press (produced by Flavortech) and rough-filtrated. The filtrate obtained by the rough filtration was supplied to a disk centrifuge (Alfa Laval K.K.) at a rate of 2,500 L/hour to be separated into a coffee extract, a coffee oil-containing liquid, and a sludge containing fine powder of ground coffee.

Next, the coffee extract obtained by the centrifugal separation was supplied to a Centritherm (produced by FT Industrial) at a rate of 2,500 L/hour and concentrated at 50° C. The resultant pre-clarification concentrated coffee extract was treated with filtering material filtration using a ceramic membrane, to obtain a clarified and concentrated coffee extract. The obtained clarified and concentrated coffee extract and the aroma component-containing distillate were mixed at a ratio of the clarified and concentrated coffee extract:the aroma component-containing distillate=4:1 (by weight) to obtain a concentrated coffee extract (aroma-containing clarified and concentrated coffee extract) having a soluble solid content of 20% by weight.

Comparative Example 1

Production of a concentrated coffee extract by a counter-current multi-stage extraction method using a fixed bed extraction column:

Roasted Colombia coffee beans substantially the same as those of Example 1 (produced by Takasago Coffee Co., Ltd.) were ground into an average particle diameter of 1.7 mm using a roll mill and put into six fixed bed extraction columns. Using a counter-current semi-continuous extraction method at an extracting temperature of 120° C., a fixed bed column-extracted concentrated coffee extract having a soluble solid content of 25% by weight was obtained.

Comparative Example 2

Production of a concentrated coffee extract by a counter-current multi-stage extraction method using a fixed bed extraction column:

A fixed bed column-extracted concentrated coffee extract having a soluble solid content of 25% by weight was obtained in substantially the same manner as in Comparative example 1 except that Brazil Arabica coffee beans were used.

Comparative Example 3

Production of a concentrated coffee extract by a counter-current multi-stage extraction method using a fixed bed extraction column:

A fixed bed column-extracted concentrated coffee extract having a soluble solid content of 25% by weight was obtained in substantially the same manner as in Comparative example 1 except that Mocha coffee beans were used.

Comparative Example 4

An aroma-containing concentrated coffee extract was obtained in substantially the same manner as in Example 4 except that the filtering material filtration (fine filtration step) using the ceramic membrane was not performed.

Example 6

The concentrated coffee extract of Example 1 and the concentrated coffee extract of Comparative example 1 were mixed such that the ratio of the soluble solid content derived from the concentrated coffee extract of Example 1 would be 10% by weight based on the total weight of the soluble solid content in the mixed concentrated coffee extract, to obtain a Colombia type mixed concentrated coffee extract. The resultant mixed concentrated coffee extract was adjusted with baking soda water to have a Brix of 1.3 and pH of 6.1, put into a can and sterilized. Thus, a coffee drink was obtained.

Examples 7 and 8

The concentrated coffee extracts of Example 2 and Comparative example 2, and the concentrated coffee extracts of Example 3 and Comparative example 3, were mixed in substantially the same manner as in Example 6, to obtain a Brazil type mixed concentrated coffee extract and a Mocha type mixed concentrated coffee extract, respectively. The resultant mixed concentrated coffee extracts were treated in substantially the same manner as in Example 6 to obtain a Brazil type coffee drink (Example 7) and a Mocha type coffee drink (Example 8), respectively.

Comparative Examples 5 Through 7

The concentrated coffee extracts of Comparative examples 1 through 3 were each adjusted with baking soda water to have a Brix of 1.3 and pH of 6.1, put into a can and sterilized. Thus, coffee drinks were obtained.

Sensory Test Example 1

Sensory evaluation of coffee drinks obtained by different extraction methods:

A panel of 11 experts tasted the coffee drinks of Examples 6 through 8 and Comparative examples 5 through 7, and compared the examples and the comparative examples regarding the aroma and the tastiness. The number of experts who evaluated each example preferable, and representative comments on the feature of each example are shown in Table 1.

TABLE 1

Sensory evaluation of coffee drinks

| Evaluation sample | Comparative sample | Number of experts | Feature of the example |
|---|---|---|---|
| Example 6 | Comparative example 5 | 8 | Has strongly sweet aroma at the top, and provides a mild acid taste. |
| Example 7 | Comparative example 6 | 7 | Characteristically has the roasting aroma, and has a well-balanced tastiness. |
| Example 8 | Comparative example 7 | 7 | Has well-balanced aroma and tastiness. |

The following was found from Table 1. As compared to the coffee drinks prepared using the fixed bed column-extracted concentrated coffee extract of Comparative examples 5 through 7, the coffee drinks of Examples 6 through 8 according to the present invention are superior in the aroma and tastiness. In addition, since the coffee extracts according to the present invention characteristically have a grinding aroma, the coffee drinks of Examples 6 through 8 are different in flavor because of the type of the raw material coffee beans or the like.

Examples 9 and 10

A commercially available concentrated coffee extract obtained using Colombia beans (produced by a counter-current multi-stage extraction method using a fixed bed extraction column) having a soluble solid content of 15% by weight (produced by Takasago Coffee Co., Ltd.) was mixed with the aroma-containing clarified and concentrated coffee extract of Example 1 to obtain a mixed concentrated coffee extract. The aroma-containing clarified and concentrated coffee extract of Example 1 was mixed such that the soluble solid content derived from the aroma-containing clarified and concentrated coffee extract of Example 1 would be 5% by weight and 10% by weight based on the total weight of the soluble solid content in the mixed concentrated coffee extract. The resultant substances were each adjusted with baking soda water to have a Brix of 1.3 and pH of 6.1, put into a can and sterilized. Thus, sugar-free black coffee drinks were obtained.

Comparative Example 8

Sugar-free black coffee drinks were obtained in substantially the same manner as in Examples 9 and 10 except that the mixing was performed such that the soluble solid content derived from the aroma-containing clarified and concentrated coffee extract of Example 1 would be 1% by weight based on the total weight of the soluble solid content in the mixed concentrated coffee extract.

Comparative Example 9

The commercially available concentrated coffee extract obtained using Colombia beans of Examples 9 and 10, having a soluble solid content of 15% by weight (produced by Takasago Coffee Co., Ltd.) was independently adjusted with baking soda water to have a Brix of 1.3 and pH of 6.1, put into a can and sterilized. Thus, a coffee drink was obtained.

Sensory Test Example 2

Evaluation of the effect provided when added to a commercially available (fixed bed column-extracted) concentrated coffee extract:

A panel of 13 experts compared the coffee drinks of Examples 9 and 10 and Comparative example 8 with the coffee drink of Comparative example 9 regarding the aroma and the tastiness. The number of experts who responded that each of the coffee drinks of Examples 9 and 10 and Comparative example 8 has a preferable grinding aroma of the roasted coffee beans and provides a feel of body like dripped coffee brew is shown in Table 2.

TABLE 2

Sensory evaluation of coffee drinks

| | |
|---|---|
| Example 9 (soluble solid content derived from the concentrated coffee extract of Example 1: 5% by weight) | 8 |
| Example 10 (soluble solid content derived from the concentrated coffee extract of Example 1: 10% by weight) | 11 |

TABLE 2-continued

Sensory evaluation of coffee drinks

| | |
|---|---|
| Comparative example 8 (soluble solid content derived from the concentrated coffee extract of Example 1: 1% by weight) | 6 |

It was found from Table 2 that, when used for a coffee drink, a mixed concentrated coffee extract, obtained by mixing an aroma-containing clarified and concentrated coffee extract according to the present invention and a commercially available concentrated coffee extract such that the soluble solid content derived from the aroma-containing clarified and concentrated coffee extract would be 10% by weight based on the total weight of the soluble solid content in the mixed concentrated coffee extract, provides a highly excellent effect regarding the flavor of the coffee drink.

It was also found that, when used for a coffee drink, a mixed concentrated coffee extract, obtained by mixing such that the soluble solid content derived from the aroma-containing clarified and concentrated coffee extract would be 5% by weight based on the total weight of the soluble solid content in the mixed concentrated coffee extract, can obtain a high evaluation on the functions.

Analysis Test Example 1

Figure 2:
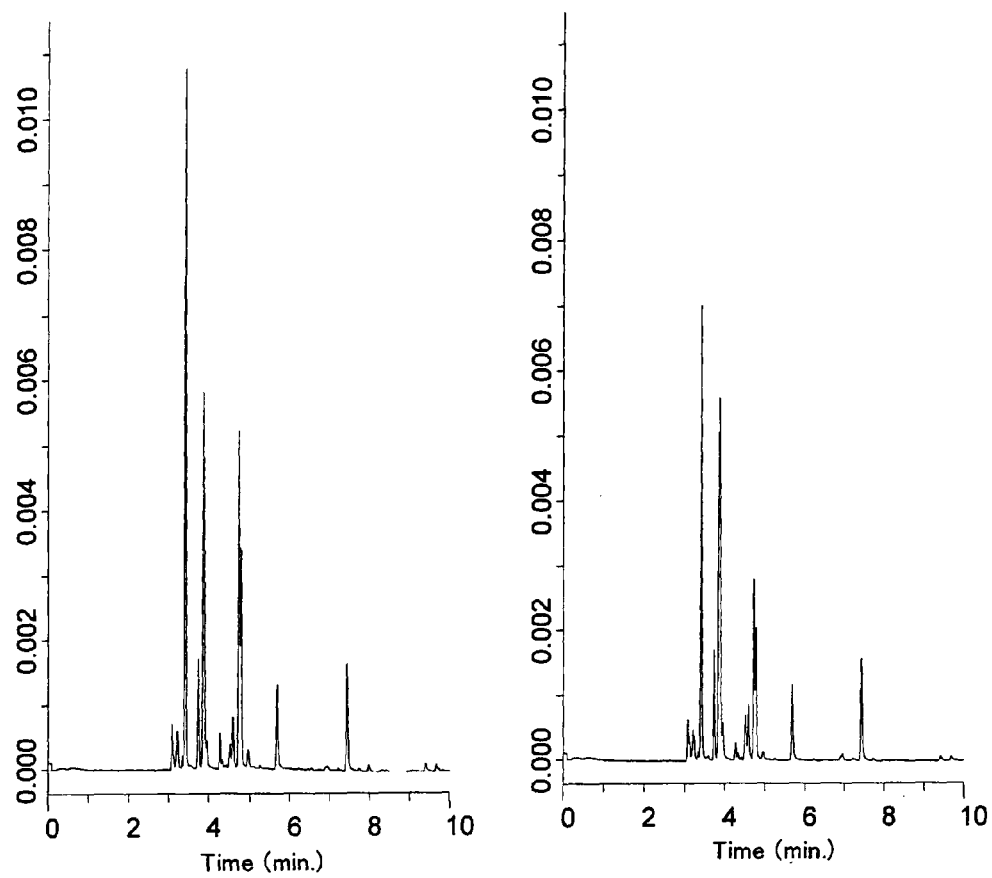
FIG. 2 shows analysis charts by headspace gas chromatography (HS-GC) performed on concentrated coffee extracts of Example 1 and Comparative example 1.

Comparison of headspace gas chromatography analysis results:

The concentrated coffee extracts of Example 1 and Comparative example 1 were each diluted to have a Brix of 1.3 and subjected to static headspace gas chromatography analysis. The charts are shown in FIG. 2. The sum of the peak area values in a retaining period from 0 to 10 minutes, which is considered to provide the top note of the respective concentrated coffee extract, was 86922 and 68935. It was found that the concentrated coffee extract according to the present invention contains a larger amount of aroma component. The conditions for the gas chromatography were as follows.

<Gas Chromatography Conditions>

Sealed vials were heated to 80° C. by an autosampler for gas chromatography produced by Perkin Elmer, and the vaporized component was introduced into a gas chromatographer produced by Shimadzu Corporation for analysis. Column: TC-WAX (60 m×0.32 mm I.D.); carrier gas: helium; column temperature: 50° C. (4 minutes)→230° C. (raised at 4° C./min.); detector: FID; detector temperature: 250° C.

Analysis Test Example 2

Comparison of the amounts of diethylether extracts:

90 g of each of the concentrated coffee extracts of Examples 1 through 3 and Comparative examples 1 through 3 were extracted by liquid-liquid extraction using 100 mL of diethylether. Then, the diethylether phase was separated and recovered, and the diethylether solvent was evaporated by a vacuum evaporator. Thus, a diethylether extract contained in the concentrated coffee extract was obtained. The weight percent of the diethylether extract based on the total weight of the soluble solid content in the concentrated coffee extract was calculated. The results are shown in Table 3.

TABLE 3

Amounts of the diethylether extracts in the concentrated coffee extracts

| | Amount of diethylether extract based on the soluble solid content (wt. %) | | Amount of diethylether extract based on the soluble solid content (wt. %) |
|---|---|---|---|
| Example 1 | 2.12 | Comparative example 1 | 2.80 |
| Example 2 | 2.42 | Comparative example 2 | 3.23 |
| Example 3 | 2.16 | Comparative example 3 | 2.87 |

It was found from Table 3 that the concentrated coffee extracts of Examples 1 through 3 according to the present invention contain a smaller amount of coffee oil as compared to the concentrated coffee extracts produced by the fixed bed column extraction method (Comparative examples 1 through 3).

Analysis Test Example 3

Measurement of the amount of lipid in the precipitate:

The concentrated coffee extract of Example 1 was stored in a freezing state at −25° C. for 1 month, unfrozen at room temperature, and subjected to centrifugal precipitation at 3,000 rpm for 30 minutes. The supernatant was decanted to recover the paste-like precipitate. The paste-like precipitate was analyzed regarding the components. The amount of lipid in the dried precipitate was 5.95% (acid decomposition method), and the precipitate contained the lipid in the extract. Namely, the oil contained in the concentrated coffee extract was one substance causing the precipitation. It was found that, when stable transparency is desired, a smaller content of coffee oil (diethylether extract) is preferable.

Analysis Test Example 4

Clearness comparison:

The concentrated coffee extracts of Examples 4 and 5 and Comparative example 4 were each diluted with ion-exchanged water to have a Brix of 0.5, and the turbidity was measured using a turbidimeter (2100P Turbidimeter, produced by HACH). About 50 g of each concentrated coffee extract was put into a centrifugal precipitation tube, and subjected to centrifugal precipitation at 3000 rpm for 10 minutes. Then, the supernatant was decanted, and the amount of the precipitate remaining in the centrifugal precipitation tube (centrifugal precipitation amount) was measured. The results are shown in Table 4.

TABLE 4

Turbidity and centrifugal precipitation amount of the concentrated coffee extracts

| | Turbidity (NTU) | Centrifugal precipitation amount (w/w %) |
|---|---|---|
| Example 4 | 0.92 | 0.18 |
| Example 5 | 0.89 | 0.26 |
| Comparative example 4 | 260 | 8.42 |

It was found from Table 4 that the concentrated coffee extracts of Examples 4 and 5 according to the present invention have a lower turbidity and a smaller centrifugal precipitation amount and so a higher clearness as compared to the concentrated coffee extract produced without the fine filtration (Comparative example 4).

Example 11

The coffee oil-containing liquid recovered by the centrifugal separation step in Example 2 was mixed with the aroma-containing clarified and concentrated coffee extract obtained in Example 2, such that the coffee oil-containing liquid is included at 3% by weight based on the total weight of the mixed oil aroma-containing concentrated coffee extract. The resultant substance was homogeneously mixed using a TK homomixer (Tokushukika Kogyo K.K.) at room temperature at 9000 rpm for 20 minutes, to obtain a homogenized oil aroma-containing concentrated coffee extract. The steps are shown in FIG. 1. The concentration of the soluble solid content of the resultant oil aroma-containing concentrated coffee extract was 20% by weight, and the amount of the diethyl-ether extract based on the total weight of the soluble solid content was 11.4% by weight.

Example 12

The concentrated coffee extract produced in Example 2 was diluted with ion-exchanged water, adjusted to have a pH of 6.1 with baking soda water, and then adjusted to have a Brix of 1.3 with ion-exchanged water. After the adjustment, the resultant substance was put into a 500 mL PET bottle and sterilized at 80° C. for 10 minutes. Thus, a sugar-free black coffee drink was obtained.

Example 13

A sugar-free black coffee drink was obtained in substantially the same manner as in Example 12 except that the concentrated coffee extract of Example 11 was used.

Analysis Test Example 5

Storage stability of the black coffee drinks:
The sugar-free black coffee drinks obtained in Examples 12 and 13 were stored at 4° C., 25° C. and 40° C. for 2 weeks and the over-time change was observed. Regarding Example 12, no separation or coagulation was observed and stable transparency was maintained even after 2 weeks at any of the tested temperatures. Regarding Example 13, separation and coagulation occurred during the storage test, and coagulates containing coffee oil were floating in the upper part of the bottle. The floats were dispersed and the coffee drink was returned back into a homogeneous state when stirred by a mixer or the like.

It was found from the test results that the aroma-containing clarified and concentrated coffee extract of Example 2 used in Example 12 is optimum for a product required to be transparent. The oil aroma-containing concentrated coffee extract of Example 11 used in Example 13 is enriched in tastiness and suitable to a product which contains a dairy component or the like and thus is not required to be transparent.

Example 14, Comparative Example 10

Production of jelly:
The concentrated coffee extracts obtained in Example 2 and Comparative example 2 were used to produce jelly in Example 14 and Comparative example 10 with the following formulation, respectively. As the container for the jelly, a transparent plastic container was used.

| <Formulation of jelly> | |
| --- | --- |
| Granulated sugar | 9.00% by weight |
| Starch syrup | 4.80% by weight |
| Uni-agar | 0.90% by weight |
| Concentrated coffee extract (Example 2, Comparative example 2) | 3.70% by weight |
| Ion-exchanged water | Remaining amount |
| Total | 100.00% by weight |

Sensory Test Example 3

A panel of 13 experts tasted the jelly of Example 14 and Comparative example 10, and evaluated the external appearance, aroma and tastiness thereof.

The jelly of Example 14 and the jelly of Comparative example 10 both exhibited an external appearance suitable as a product provided in a transparent container. Regarding the aroma and tastiness, the jelly of Example 14 characteristically had a roasting aroma even after being processed and had a good balance of tastiness. The jelly of Comparative example 10 had the tastiness of coffee but tasted mediocre. The jelly of Example 14 was evaluated to have the preferable transparency, and excellent aroma and tastiness.

Example 15, Comparative Example 11

Production of lacto ice cream:
The concentrated coffee extracts obtained in Example 11 and Comparative example 2 were used to produce lacto ice cream in Example 15 and Comparative example 11 with the following formulation, respectively.

| <Formulation of lacto ice cream> | |
| --- | --- |
| Milk | 5.00% by weight |
| Powdered skim milk | 8.50% by weight |
| Unsalted butter | 0.40% by weight |
| Purified palm oil | 7.00% by weight |
| Uni-gel GEO | 0.55% by weight |
| Granulated sugar | 11.50% by weight |
| Starch syrup | 7.00% by weight |
| Concentrated coffee extract (Example 11, Comparative example 2) | 3.70% by weight |
| Ion-exchanged water | Remaining amount |
| Total | 100.00% by weight |

Sensory Test Example 4

A panel of 13 experts tasted the lacto ice cream of Example 15 and Comparative example 11. Eleven experts gave an evaluation that Example 15 has a better thickness of taste. It was found that, when used in lacto ice cream, a concentrated coffee extract containing the separated and recovered coffee oil-containing liquid provides a thickness of taste.

Example 16, Comparative Example 12

Production of pudding:

The concentrated coffee extracts obtained in Example 11 and Comparative example 2 were used to produce pudding in Example 16 and Comparative example 12 with the following formulation.

| <Formulation of pudding> | |
|---|---|
| Milk | 10.00% by weight |
| Powdered skim milk | 5.40% by weight |
| Fresh cream | 3.70% by weight |
| Uni-agar CM-55 | 1.80% by weight |
| Granulated sugar | 13.00% by weight |
| Starch syrup | 7.30% by weight |
| Emulsifier | 0.10% by weight |
| Concentrated coffee extract (Example 11, Comparative example 2) | 3.70% by weight |
| Ion-exchanged water | Remaining amount |
| Total | 100.00% by weight |

Sensory Test Example 5

A panel of 13 experts tasted the pudding of Example 16 and the pudding of Comparative example 12. Eleven experts gave an evaluation that Example 16 has a better thickness of taste. Namely, when used in pudding, a concentrated coffee extract containing the separated coffee oil-containing liquid provided a thickness of taste.

INDUSTRIAL APPLICABILITY

According to the present invention, a stable concentrated coffee extract which is rich in aroma component released when the roasted coffee beans are ground and has an amount of coffee oil controllable in accordance with the final product can be provided.

The invention claimed is:

1. A process for producing an aroma-containing clarified and concentrated coffee extract, the process comprising the steps of:
   (a) adding a liquid to roasted coffee beans and wet-grinding the resultant substance to form a slurry;
   (b) stripping-treating the slurry formed in step (a) to separate an aroma component-containing distillate and the stripping-treated slurry from each other;
   (c) rough-filtrating the stripping-treated slurry obtained in step (b);
   (d) separating the rough-filtrated filtrate obtained in step (c) into three layers of a coffee oil-containing liquid, a coffee extract and a sludge using a three-layer centrifuge;
   (e) fine-filtrating the coffee extract obtained in step (d) to obtain a clarified coffee extract;
   (f) concentrating the clarified coffee extract obtained in step (e) to obtain a clarified and concentrated coffee extract; and
   (g) mixing the clarified and concentrated coffee extract obtained in step (f) with a part of, or the entirety of, the aroma component-containing distillate obtained in step (b) to obtain the aroma-containing clarified and concentrated coffee extract.

2. The process according to claim 1, wherein the concentration of the roasted and wet-grinded coffee beans in the slurry in step (a) including the roasted and wet-grinded coffee beans and the liquid is in the range of 3 to 30% by weight based on the total weight of the slurry.

3. The process according to claim 1, wherein the average particle diameter of the roasted and wet-grinded coffee beans in step (a) is in the range of 300 μm to 1 mm.

4. The process according to claim 1, wherein the temperature of the liquid in step (a) is in range of 1 to 40° C.

5. The process according to claim 1, wherein step (b) uses a continuous film distillation apparatus as a stripping-treatment apparatus.

6. The process according to claim 1, wherein the aroma component-containing distillate separated in step (b) is included in the range of 1 to 10% by weight based on the total weight of the slurry formed in step (a).

7. The process according to claim 1, wherein the fine-filtration in step (e) is filter aid filtration and/or filtering material filtration.

8. An aroma-containing clarified and concentrated coffee extract produced in a process according to claim 1, wherein the aroma-containing clarified and concentrated coffee extract has a concentration of a soluble solid content in the range of 1 to 70% by weight, and contains a diethylether extract in an amount of equal to or less than 8% by weight based on the total weight of the soluble solid content.

9. A mixed concentrated coffee extract, comprising an aroma-containing clarified and concentrated coffee extract produced in a process according to claim 1 and a fixed bed column-extracted concentrated coffee extract obtained by a counter-current multi-stage extraction method using a fixed bed extraction column; wherein a soluble solid content derived from the aroma-containing clarified and concentrated coffee extract is equal to or higher than 5% by weight based on the total weight of a soluble solid content in the mixed concentrated coffee extract.

10. A process for producing an oil aroma-containing concentrated coffee extract, the process comprising the steps of in addition to the process according to claim 1;
   (h) adding a part of, or the entirety of, the coffee oil-containing liquid obtained in step (d) to the aroma-containing clarified and concentrated coffee extract obtained in step (g) and homogeneously mixing the resultant substance.

11. An oil aroma-containing concentrated coffee extract produced in a process according to claim 10, which has a concentration of a soluble solid content in the range of 1 to 70% by weight, and contains a diethylether extract in an amount in the range of 3 to 30% by weight based on the total weight of the soluble solid content.

12. A mixed concentrated coffee extract, comprising an oil aroma-containing concentrated coffee extract produced in a process according to claim 10, and a fixed bed column-extracted concentrated coffee extract obtained by a counter-current multi-stage extraction method using a fixed bed extraction column; wherein a soluble solid content derived from the oil aroma-containing concentrated coffee extract is equal to or higher than 5% by weight based on the total weight of a soluble solid content in the mixed concentrated coffee extract.

13. A process for producing an aroma-containing clarified and concentrated coffee extract, the process comprising the steps of:
   (a) adding a liquid to roasted coffee beans and wet-grinding the resultant substance to form a slurry;
   (b) stripping-treating the slurry formed in step (a) to separate an aroma component-containing distillate and the stripping-treated slurry from each other;

(c) rough-filtrating the stripping-treated slurry obtained in step (b);
(d) separating the rough-filtrated filtrate obtained in step (c) into three layers of a coffee oil-containing liquid, a coffee extract and a sludge using a three-layer centrifuge;
(e') concentrating the coffee extract obtained in step (d) to obtain a pre-clarification concentrated coffee extract;
(f') fine-filtrating the pre-clarification concentrated coffee extract obtained in step (e') to obtain a clarified and concentrated coffee extract; and
(g) mixing the clarified and concentrated coffee extract obtained in step (f') with a part of, or the entirety of, the aroma component-containing distillate obtained in step (b) to obtain the aroma-containing clarified and concentrated coffee extract.

14. The process according to claim 13, wherein the concentration of the roasted and ground coffee beans in the slurry in step (a) including the roasted and wet-grinded coffee beans and the liquid is in the range of 3 to 30% by weight based on the total weight of the slurry.

15. The process according to claim 13, wherein the average particle diameter of the roasted and ground coffee beans in step (a) is in the range of 300 µm to 1 mm.

16. The process according to claim 13, wherein the temperature of the liquid in step (a) is in range of 1 to 40° C.

17. The process according to claim 13, wherein step (b) uses a continuous film distillation apparatus as a stripping-treatment apparatus.

18. The process according to claim 13, wherein the aroma component-containing distillate separated in step (b) is included in the range of 1 to 10% by weight based on the total weight of the slurry formed in step (a).

19. The process according to claim 8, wherein the fine-filtration in step (f') is filtration using a filter aid and/or a filtering material.

20. A process for producing an oil aroma-containing concentrated coffee extract, the process comprising the step of, in addition to the process according to claim 13;

(h) adding a part of, or the entirety of, the coffee oil-containing liquid obtained in step (d) to the-aroma-containing clarified and concentrated coffee extract obtained in step (g) and homogeneously mixing the resultant substance.

* * * * *